United States Patent
Zhou et al.

(10) Patent No.: US 12,557,126 B2
(45) Date of Patent: Feb. 17, 2026

(54) USER EQUIPMENT (UE) CAPABILITY FOR RADIO RESOURCE CONTROL (RRC) BASED BANDWIDTH PART (BWP) SWITCHING DELAY

(71) Applicant: Apple Inc., Cupertino, CA (US)

(72) Inventors: Yuhan Zhou, La Jolla, CA (US); Yang Tang, Cupertino, CA (US); Jie Cui, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 719 days.

(21) Appl. No.: 17/609,012

(22) PCT Filed: May 13, 2020

(86) PCT No.: PCT/US2020/032666
§ 371 (c)(1),
(2) Date: Nov. 5, 2021

(87) PCT Pub. No.: WO2020/232116
PCT Pub. Date: Nov. 19, 2020

(65) Prior Publication Data
US 2022/0217707 A1    Jul. 7, 2022

Related U.S. Application Data

(60) Provisional application No. 62/847,120, filed on May 13, 2019.

(51) Int. Cl.
*H04W 72/51* (2023.01)
*H04W 60/04* (2009.01)
*H04W 72/044* (2023.01)
*H04W 72/21* (2023.01)
*H04W 76/22* (2018.01)

(52) U.S. Cl.
CPC .......... *H04W 72/51* (2023.01); *H04W 60/04* (2013.01); *H04W 72/044* (2013.01); *H04W 72/21* (2023.01); *H04W 76/22* (2018.02)

(58) Field of Classification Search
CPC ..... H04W 72/51; H04W 76/22; H04W 72/21; H04W 60/04; H04W 72/044
See application file for complete search history.

(56) References Cited

U.S. PATENT DOCUMENTS

| | | | |
|---|---|---|---|
| 2018/0084539 A1* | 3/2018 | Kubota | H04W 72/51 |
| 2019/0104543 A1 | 4/2019 | Park | |
| 2019/0254056 A1* | 8/2019 | Salah | H04W 72/1263 |
| 2021/0377988 A1* | 12/2021 | Zhou | H04W 72/20 |
| 2022/0182911 A1* | 6/2022 | Eklöf | H04W 72/23 |

OTHER PUBLICATIONS

R4-1904701, 3GPP TSG-RAN4 Meeting #90bis, Xi'an, China, Apr. 8-12, 2019 (Year: 2019).*

(Continued)

*Primary Examiner* — Kenny S Lin
(74) *Attorney, Agent, or Firm* — Eschweiler & Potashnik, LLC; Matthew Glause

(57) ABSTRACT

The disclosure relates to RRC based BWP switching delay and use of UE capability information to minimize the amount of schedules BWP switching delay for those UE with capabilities that can properly transmit and receive data under lower BWP switching delay constraints.

18 Claims, 10 Drawing Sheets

(56) References Cited

OTHER PUBLICATIONS

PCT Search Report dated Aug. 6, 2020 in connection with PCT Application No. PCT/US2020/032666.
PCT Written Opinion dated Aug. 6, 2020 in connection with PCT Application No. PCT/US2020/032666.
Nokia et al: "On RRC-based BWP switch requirements" 3GPP Draft; R4-1904506; vol. Ran WG4; Apr. 1, 2019; URL: http://www.3gpp.org/ftp/tsg%5Fran/WG4%5FRadio/TSGR4%5F90Bis/Docs/R4%2D1904506%2Ezip.
Nokia et al: "On RRC-based BWP switch requirements" 3GPP Draft; R4-1906241; vol. Ran WG4; May 3, 2019; URL: http://www.3gpp.org/ftp/tsg%5Fran/WG4%5FRadio/TSGR4%5F91/Docs/R4%2D1906241%2Ezip.
3rd Generation Partnership Project; Technical Specification Group Radio Access Network; NR; "Radio Resource Control (RRC) protocol Specification (Release 15)" 3 GPP TS 38.31; V15.5.1; Apr. 16, 2019.
EP Office Action dated Mar. 18, 2024 in connection with Application Serial No. 20729910.8.
Intel: "Adhoc Minutes for Signal Characteristics", 3GPP Draft; R4-1902378 Adhoc Minutes for NR Signal Characteristics—After Adhoc, 3rd Generation Partnership Project (3GPP), Mobile Competence Centre; 650, Route Des Lucioles; F-06921 Sophia-Sntipolis, vol. RAN WG4, No. Athens, Greece; Feb. 25, 2019-Mar. 1, 2019 Mar. 5, 2019 (Mar. 5, 2019), XP051695966, Retrieved from the Internet: URL:http://www.3gpp.org/ftp/tsg%5Fran/WG4%5FRadio/TSGR4%5F90/Docs/R4%2D1902378%2Exip [retrieved on Mar. 5, 2019].
Intel: "Adhoc Minutes for Signal Characteristics", 3GPP Draft; R4-1904782 Adhoc Minutes for NR Signal Characteristics, 3rd Generation Partnership Project (3GPP), Mobile Competence Centre; 650, Route Des Lucioles; F-06921 Sophia-Antipolis Cedex, vol. RAN WG4, No. Xi'an, China; Apr. 8, 2019-Apr. 12, 2019 Apr. 15, 2019 (Apr. 15, 2019), XP051715094, Retrieved from the Internet: URL:http://www.3gpp.org/ftp/tsg%5Fran/WG4%5FRadio/TSGR4%5F90Bis/Docs/R4%2D1904782%2Ezip [retrieved on Apr. 15, 2019].
NEC: "Draft CR to 38.133: RRC based BWP switch delay requirements", 3GPP Draft; R4-1903621, 3rd Generation Partnership Project (3GPP), Mobile Competence Centre; 650, Route Des Lucioles; F-06921 Sophia-Antipolis Cedex; France, vol. RAN WG4, No. Xi'an, China; Apr. 8, 2019-Apr. 12, 2019 Apr. 1, 2019 (Apr. 1, 2019), XP051714027, Retrieved from the Internet: URL:http://www.3gpp.org/ftp/tsg%5Fran/WG4%5FRadio/TSGR4%5F90Bis/Docs/R4%2D1903621%Ezip [retrieved on Apr. 1, 2019].
Intel Corporation:"On the requirement for RRC based BWP switching", 3GPP Draft; R4-1905720 On The Requirement for RRC Based BWP Switching. 3rd Generation Partnership Project (3GPP), Mobile Competence Centre; 650 Route Des Lucioles; F-06921 Sophia-Antipolis Cedex, vol. RAN WG4, No. Reno, US; May 13, 2019-May 17, 2019 May 3, 2019 (May 3, 2019), XP051715794, Retrieved from the Internet: URL: http://www.3gpp.org/ftp/tsg%5Fran/WG4%5FRadio/TSGR4%5F91/Docs/R4%2D1905720%2Wzip [retrieved on May 4, 2019].
Nokia, Nokia Shanghai Bell; Change Request; "CR on RRC and MAC based BWP switch"; 3GPP TSG-RAN4 Meeting #90; R4-1901288; Feb. 25, 2019.
International Preliminary Report on Patentability dated Nov. 16, 2021 in connection with PCT Application No. PCT/US2020/032666.

* cited by examiner

| BWP switch delay $T_{BWPswitchDelayRRC}$ (ms) | |
|---|---|
| Type 1 | Type 2 |
| 5ms | 8ms |

*FIG. 7A*

| BWP switch delay $T_{BWPswitchDelayRRC}$ (ms) | |
|---|---|
| Type 1 | Type 2 |
| X | Y |

*FIG. 7B*

USER EQUIPMENT (UE) CAPABILITY FOR RADIO RESOURCE CONTROL (RRC) BASED BANDWIDTH PART (BWP) SWITCHING DELAY

CROSS REFERENCE TO RELATED APPLICATIONS

This application is a National Phase entry application of International Patent Application No. PCT/US2020/032666 filed May 13, 2020, which claims priority to U.S. Provisional Patent Application No. 62/847,120 filed on May 13, 2019, entitled "USER EQUIPMENT (UE) CAPABILITY FOR RADIO RESOURCE CONTROL (RRC) BASED BANDWIDTH PART (BWP) SWITCHING DELAY," which is incorporated herein by reference for all purposes.

BACKGROUND

Each year, the number of mobile devices connected to wireless networks increases significantly. In order to keep up with the demand in mobile data traffic, changes are made to system requirements and capabilities to be able to meet these demands. In mobile devices that use a battery for power, power consumption is a significant issue when enhancements in 5G and beyond are regularly attempting to deliver an increase in traffic with larger bandwidth, lower latency, and higher data rates.

As per the definition in TS38.300, with Bandwidth Adaptation (BA), the receive and transmit bandwidth of a user equipment (UE) need not be as large as the bandwidth of the cell, and can be adjusted. That is, the bandwidth can be ordered to change, e.g., to shrink during period of low activity to save power; and/or the location of the band can be ordered to change, e.g., to allow for different services. A subset of the total cell bandwidth of a cell is referred to as a Bandwidth Part (BWP), and BA is achieved by configuring the UE with BWP(s) telling the UE which of the configured BWPs is currently the active one. The change from one BWP (e.g., BWP #1) to another (e.g., BWP #2) is sometimes called BWP switching.

BRIEF DESCRIPTION OF THE DRAWINGS

FIGS. 7A-7B are tables that show two embodiments of configuring multiple types of UE capability information with respect to RRC based BWP switching delays, wherein one shows multiple fixed types, and another shows multiple configured types, according to various embodiments discussed herein.

DETAILED DESCRIPTION

Figure 1:
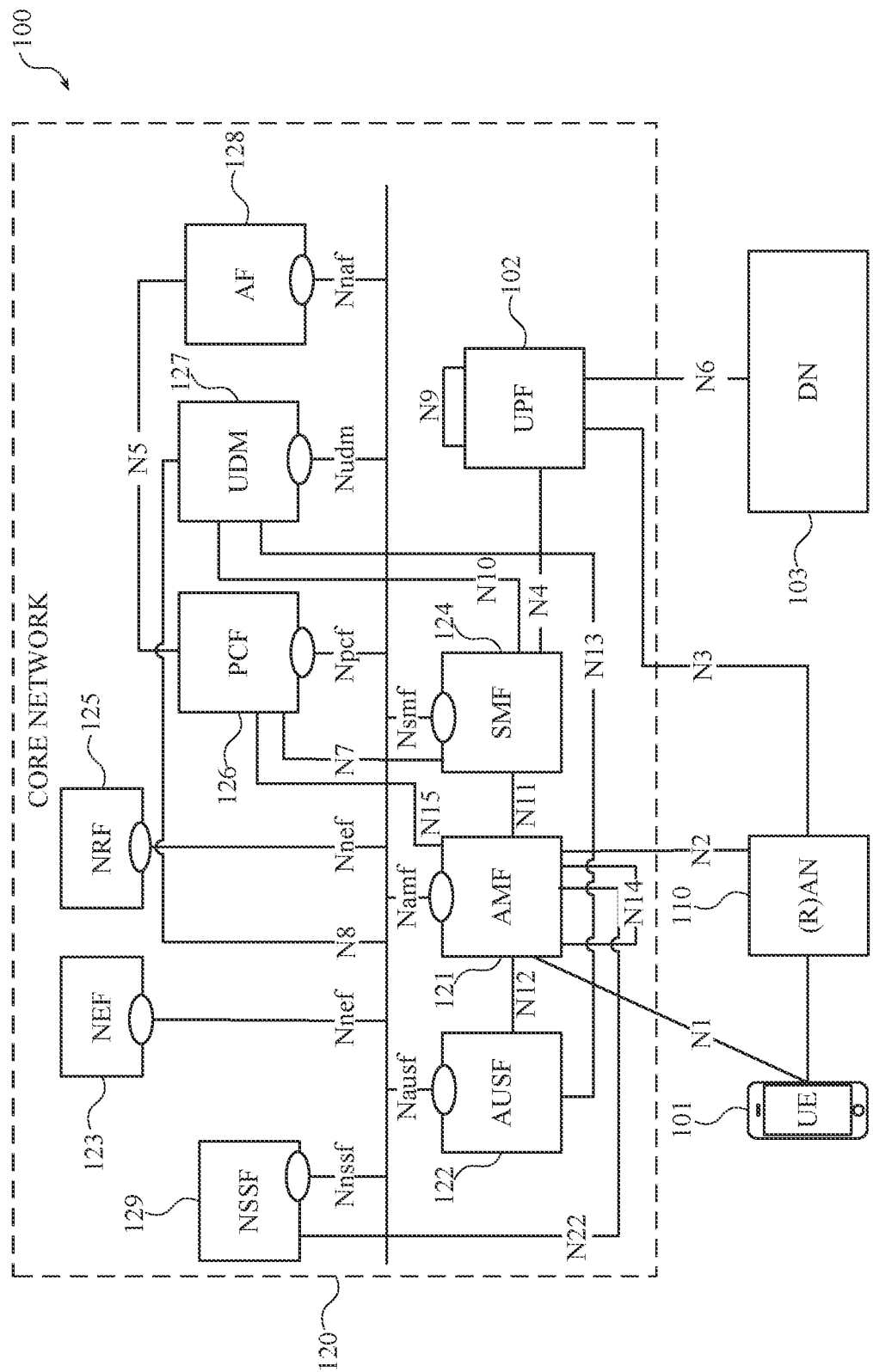
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, first through twenty-fourth additional examples for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes such as a base station (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions.

For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
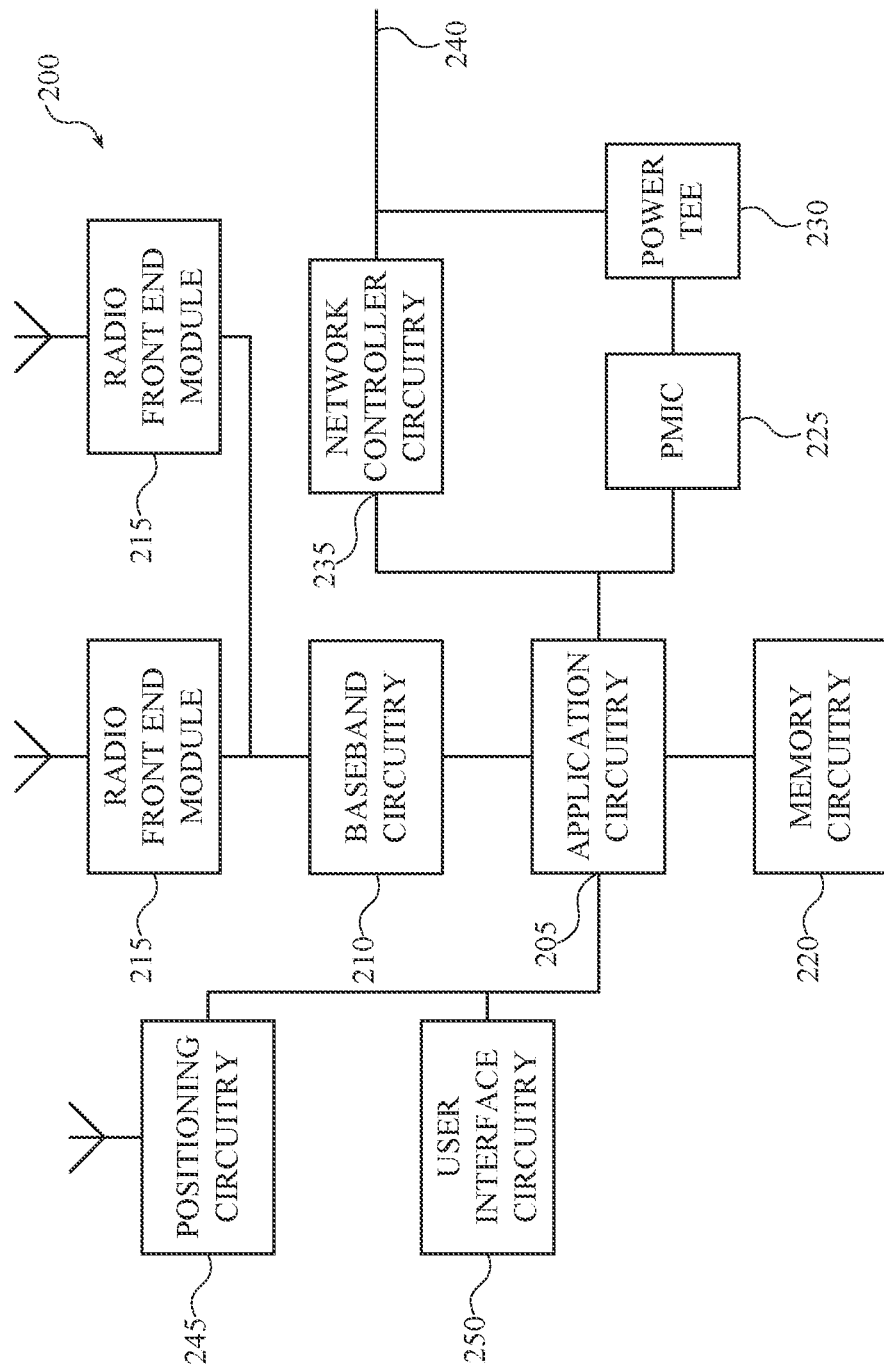
FIG. 2 is a diagram illustrating example components of an infrastructure equipment device such as a base station (BS) that can be employed in accordance with various aspects discussed herein.

Referring to FIG. 2, illustrated are example components of an infrastructure equipment device 200 in accordance with some embodiments. The infrastructure equipment 200 (or "system 200") can be implemented as a base station (e.g., eNB, gNB, etc.), radio head, RAN node such as a node of RAN 110 shown and described previously, another access point (AP) or base station (BS), application server(s), and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and user interface 250. In some embodiments, the device 200 can include additional elements such as, for example, memory/storage, display, camera, sensor, or input/output (I/O) interface. In other embodiments, the components described below can be included in more than one device. For example, said circuitries can be separately included in more than one device for CRAN, vBBU, or other like implementations.

Application circuitry 205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 can be coupled with or can include memory/storage elements and can be configured to execute instructions stored in the memory/storage to enable various applications or operating systems to run on the system 200. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 205 can comprise, or can be, a special-purpose processor/controller to operate according to the various embodiments herein. As examples, the processor(s) of application circuitry 205 can include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 200 may not utilize application circuitry 205, and instead can include a special-purpose processor/controller to process IP data received from an EPC or 5GC, for example.

User interface circuitry 250 can include one or more user interfaces designed to enable user interaction with the system 200 or peripheral component interfaces designed to enable peripheral component interaction with the system 200. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The components shown by FIG. 2 can communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX can be a proprietary bus, for example, used in a SoC based system. Other bus/IX systems can be included, such as an I2C interface, an SPI interface, point to point interfaces, and a power bus, among others.

Figure 3:
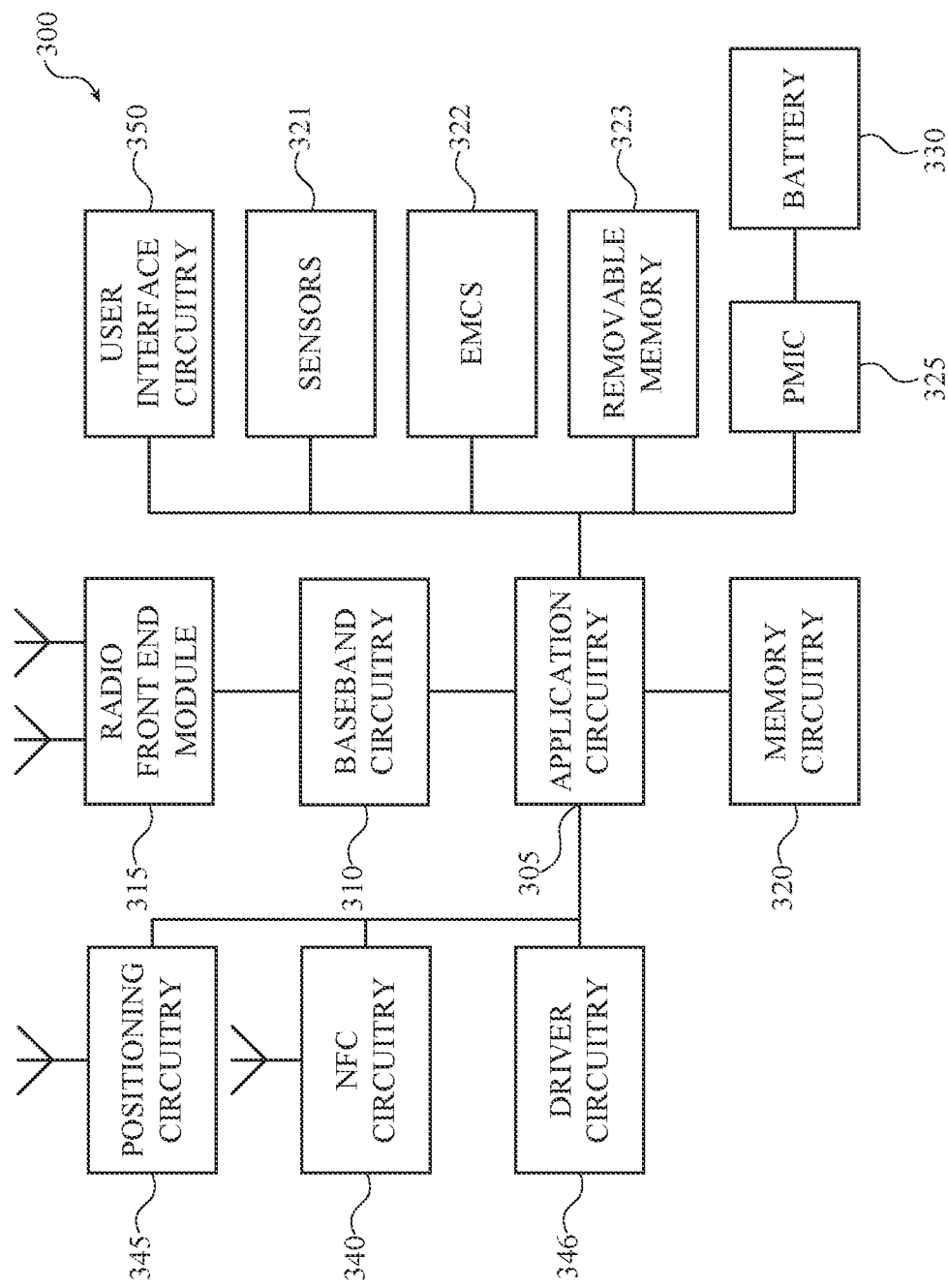
FIG. 3 is a diagram illustrating example components of a user equipment (UE) device that can be employed in accordance with various aspects discussed herein.

Referring to FIG. 3, illustrated is an example of a platform 300 (or "device 300") in accordance with various embodiments. In embodiments, the computer platform 1400 can be suitable for use as UEs 101 and/or any other element/device discussed herein. The platform 300 can include any combinations of the components shown in the example. The components of platform 300 can be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. The block diagram of FIG. 3 is intended to show a high-level view of components of the computer platform 300. However, some of the components shown can be omitted, additional components can be present, and different arrangement of the components shown can occur in other implementations.

Application circuitry 305 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 can be coupled with or can include memory/storage elements and can be configured to execute instructions stored in the memory/storage to enable various applications or operating systems to run on the system 300. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 305 can include a general or special purpose processor, such as an A-series processor (e.g., the A13 Bionic), available from Apple® Inc., Cupertino, CA or any other such processor. The processors of the application circuitry 305 can also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 can be a part of a system on a chip (SoC) in which the application circuitry 305 and other components are formed into a single integrated circuit, or a single package.

The baseband circuitry 310 can be implemented, for example, as a solder-down substrate including one or more integrated circuits, a single packaged integrated circuit soldered to a main circuit board or a multi-chip module containing two or more integrated circuits.

The platform 300 can also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

A battery 330 can power the platform 300, although in some examples the platform 300 can be mounted deployed in a fixed location, and can have a power supply coupled to an electrical grid. The battery 330 can be a lithium ion battery, a metal-air battery, such as a zinc-air battery, an aluminum-air battery, a lithium-air battery, and the like. In some implementations, such as in V2X applications, the battery 330 can be a typical lead-acid automotive battery.

Figure 4:
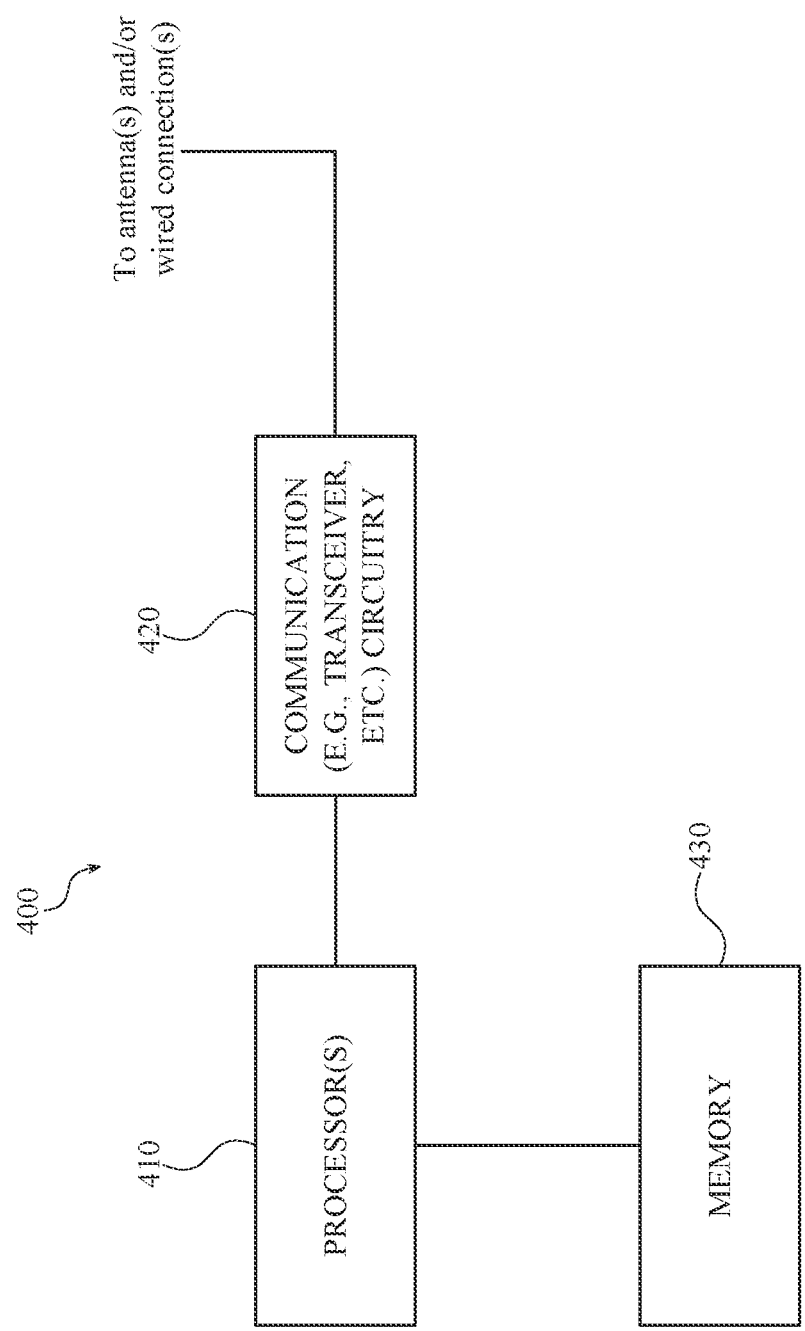
FIG. 4 is a block diagram illustrating a system that facilitates operation and maintenance of a Third Generation Partnership Project (3GPP) according to various techniques discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates operation and maintenance of a Third Generation Partnership Project (3GPP) according to various techniques discussed herein, in various embodiments. System 400 can include processor(s) 410, communication circuitry 420, and memory 430. Processor(s) 410 (e.g., which can comprise one or more processors of FIG. 2 or FIG. 3, etc.) can comprise processing circuitry and associated interface(s). Communication circuitry 420 can comprise, for example circuitry for wired and/or wireless connection(s) (e.g., Radio Front End Module(s) 215 or 315, etc.), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory circuitry 220 or 320, removable memory 323, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Figure 5:
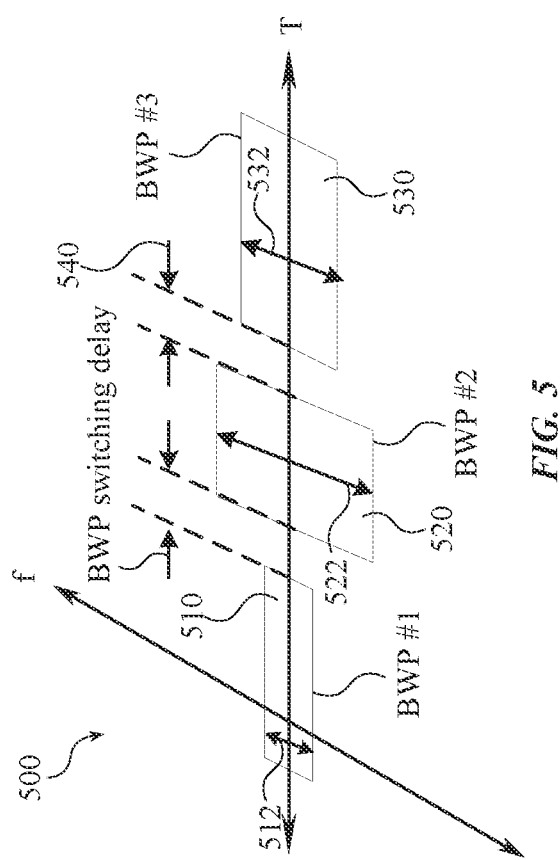
FIG. 5 is a time-frequency diagram illustrating examples of different BWPs and illustrating a BWP switching delay between the respective BWPs.

Now that the main building blocks for the framework of NR have been established, the present disclosure introduces a UE capability for RRC based BWP switching delay requirement(s). FIG. 5 illustrates a time-frequency graph 500, wherein time (T) occupies the x-axis 502, while frequency (f) occupies the z-axis 504. In FIG. 5, three distinct BWPs are illustrated, wherein a first BWP 510 occupies a first portion 512 of bandwidth, a second BWP 520 occupies a second portion 522 of bandwidth, and third BWP 530 occupies a third portion 532 of bandwidth. As clearly visible in FIG. 5, the second portion (BWP #2) 520 occupies the largest amount of bandwidth, while the first portion (BWP #1) 510 occupies the smallest portion of bandwidth in this example. During each BWP, a UE may transmit or receive data with, for example, a network node (NW) such as a base station (BS), eNodeB (eNB), gNodeB (gNB), etc., on the sub-carriers associated with that particular BWP. Upon switching from BWP #1 to BWP #2, or from BWP #2 to BWP #3, a BWP switching delay 540 exists, during which delay period no data is transmitted in either the UL or DL direction between the UE and the BS. Conventionally, the BWP switching delay period dictated by the standard has been a fixed value.

The inventors of the present disclosure have appreciated that the current RRC based switching delay value can vary significantly for different UE implementations. For example, for a 4G UE, it may need 8 ms to perform RRC based BWP switching, while a 5G UE may be able to perform RRC based BWP switching in as little as 5 ms. This difference is illustrated in FIG. 6.

Figure 6:
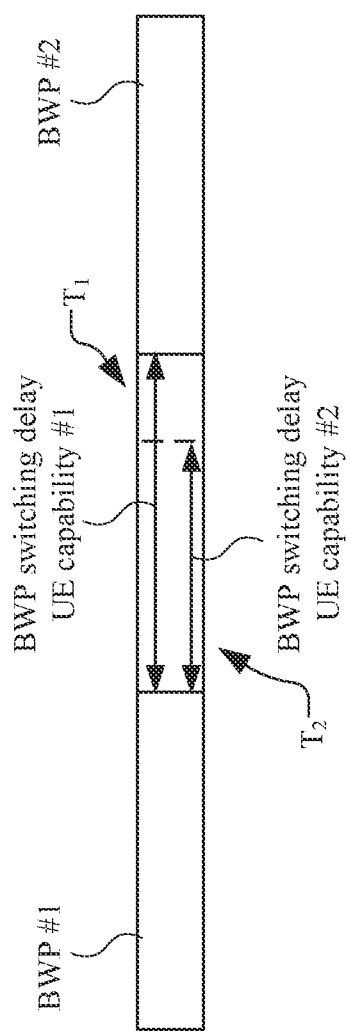
FIG. 6 is a diagram illustrating different BWP switching delay values between two BWPs associated with UEs having different capabilities.

As shown in FIG. 6, the amount of time $T_1$ required for a UE #1 to perform a BWP switching is dictated by its capabilities, and while the amount of time $T_2$ required for a UE #2 to perform a BWP switching is likewise dictated by its capabilities. As shown in FIG. 6, the capabilities of UE #2 are "greater" than the capabilities of UE #1 with respect to BWP switching, wherein UE #2 can perform such RRC based BWP switching more quickly than UE #1 that has "lesser" capabilities with respect to BWP switching. As seen in FIG. 6, if UE #2 can perform its BWP switching in time period $T_2$ and the system architecture makes no allowance for this different capability, UE #2 must wait until the end of time period $T_1$ before either receiving or transmitting data. The present disclosure allows implementation of differing BWP switching delay values based on a capability of the UE, thus allowing for reduced BWP switching delays for UEs that are able to perform such switching more quickly than legacy or other UEs, thereby facilitating greater data throughput in such instances.

In summary, different UE capabilities may result in a different amount of time to perform RRC based BWP switching, and conventional solutions set a fixed BWP switching delay value that did not take into account the UE capability of the UE performing the RRC based BWP switching. Since the NW node (e.g., the BS) will not schedule data transmissions until the end of BWP switching delay, there is no benefit for the UE to complete RRC based BWP switching earlier than the delay requirement. To address this issue and take advantage of some UEs that have greater capabilities than other UEs, embodiments herein introduce different types of RRC based BWP switching delay requirements depending on UE capability.

When the UE is configured with more than one BWP on a PCell or any activated SCell in standalone NR or NE-DC, PCell, PSCell, or any activated SCell in MCG or SCG in NR-DC, or PSCell or any activated SCell in SCG in EN-DC, the UE completes the switch of active DL and/or UL BWP within the delay discussed herein.

For RRC-based BWP switching, after the UE receives a BWP switching request, the UE shall be able to receive PDSCH (for DL active BWP switch) or transmit PUSCH (for UL active BWP switch) on the new BWP on the serving cell on which the BWP switch occurs on the first DL or UL slot right after the beginning of $$DL\ slot\ n + \frac{T_{RRCprocessingDelay} + T_{BWPswitchDelayRRC}}{NR\ Slot\ length},$$

where:

DL slot n is the last slot containing the RRC command, $T_{RRCprocessingDelay}$ is the length of the RRC procedure delay in slots defined in clause 12 in 3GPP TS 38.331 v15.5.1 (2019-04), and $T_{BWPswitchDelayRRC}$ is the BWP switching delay for RRC based BWP switch, and $T_{BWPswitchDelayRRC}$=[5~8] ms.

The UE is not required to transmit UL signals or receive DL signals during the time defined by $T_{RRCprocessingDelay}$+ $T_{BWPswitchDelayRRC}$ on the cell where RRC-based BWP switch occurs.

The RRC based BWP switching delay requirement $T_{SWPswitchDelayRRC}$=5~8 ms is quite different for different UE implementations. If the RRC based BWP switching delay is defined to 8 ms, there is no benefit in conventional systems for the UE to complete the RRC based BWP switching earlier than 8 ms, even if the UE is capable of completing the BWP switching earlier than 8 ms (e.g., 5 ms), and the NW in conventional systems will not schedule any data transmissions for the UE until the end of the delay requirement.

According to various embodiments, a UE capability regarding RRC based BWP switching delay is indicated through signaling of the bwp-SwitchingDelay or some other defined UE capability signaling. This allows the UE (e.g., UE 101 of FIG. 1) to inform the NW (e.g., RAN 110 of FIG. 1, BS, eNB or gNB) about the type(s) of delay requirement(s) that is/are supported by the UE.

For example, the UE 101 may send a suitable RRC message including one or more UE capability information elements (IEs). One of these UE capability IEs may be a physical parameters (Phy-Parameters) IE, which is used to convey the physical layer capabilities of the UE. In embodiments, the bwp-SwitchingDelay parameter may be conveyed to the NW (e.g., RAN 110) in the Phy-Parameters IE (an example of which is shown below).

Phy-Parameters Information Element

```
-- ASN1START
-- TAG-PHY-PARAMETERS-START
Phy-Parameters ::=           SEQUENCE {
    phy-ParametersCommon         Phy-ParametersCommon
OPTIONAL,
    [...]
}
Phy-ParametersCommon ::=     SEQUENCE {
    [...]
    bwp-SwitchingDelay           ENUMERATED {type1, type2}
OPTIONAL,
    ...,
```

In these embodiments, two delay types are defined for RRC based BWP switching: one is a short delay (e.g., type 1) and the other is a long delay (e.g., type 2). An additional number of delay types are also contemplated by the present disclosure. In a first embodiment, these delay types have fixed values, such as 5 ms for type 1 and 8 ms for type 2. In a second embodiment, the RRC based BWP switching delay may be defined or configured to be other values. In this embodiment, the type 1 delay may be X ms and the type 2 delay may be Y ms, wherein X and Y satisfy that 5 ms≤X, Y≤10 ms and X<Y, for example. Other types of configuring may also be employed and such alternatives are contemplated by the present disclosure. The employment of two delay types for the various embodiments discussed herein are illustrated in FIGS. 7A-7B, and discussed in greater detail below.

Once the UE reports its capability on RRC based BWP switching delay, the NW should follow the communicated UE capability to schedule data transmission in RRC based BWP switching. For example, after the UE receives a BWP switching request, the UE shall be able to receive PDSCH (for DL active BWP switch) or transmit PUSCH (for UL active BWP switch) on the new BWP on the serving cell on which BWP switch occurs on the first DL or UL slot right after the beginning of:

$$DL\ slot\ n + \frac{T_{RRCprocessingDelay} + T_{BWPswitchDelayRRC}}{NR\ Slot\ length}, \quad (1)$$

where $T_{RRCprocessingDelay}$=10 ms defined in 3GPP TS 38.331 version 15.5.1 (2019-04), and $T_{BWPswitchDelayRRC}$ is a variable value that represents the UE capability, and is defined by the table (for the first embodiment) illustrated in FIG. 7A, or the table (for the second embodiment) illustrated in FIG. 7B.

As can be seen by the equation (1) above, the full RRC based BWP switching delay is dictated by two numerator variables: (1) $T_{RRCprocessingDelay}$, and (2) $T_{BWPswitchgDelayRRC}$, where the first value is driven by the standard, and the second value is configured by the tables provided in FIGS. 7A and 7B, respectively, for example. Thus, in one embodiment shown in FIG. 7A, the UE capability information indicates the UE can perform in compliance with either a type 1 short delay of 5 ms or a type 2 long delay of 8 ms. In such instance, the network takes the appropriate value (short or long) as dictated by the UE capability information and plugs that value into the formula as the BWP switch delay RRC variable $T_{BWPswitchDelayRRC}$ which will then influence the total time calculation of equation (1).

In another embodiment, the UE capability information is configured in compliance with FIG. 7B. In such case, for example, X may be 6 ms and Y may be 8 ms. Depending on the "type" dictated by the UE capability information, the configured value is plugged into the equation (1) for $T_{BWPswitchDelayRRC}$ and the full BWP switch delay is determined. As readily appreciated, the total BWP switching delay value will be a different value as dictated by the UE capability information.

Figure 8:
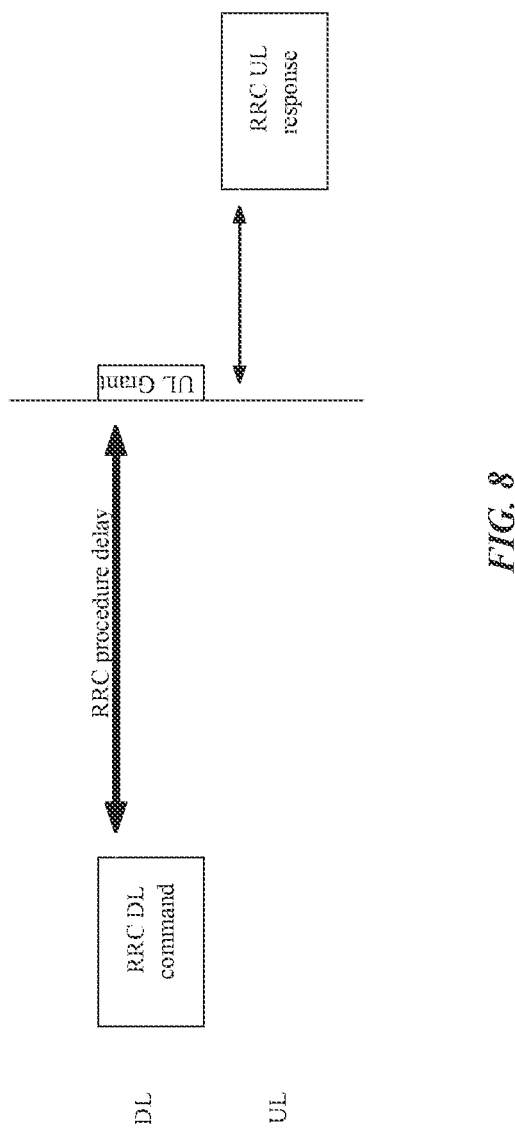
FIG. 8 is a diagram illustrating RRC procedure delay that includes the RRC based BWP switching delay, according to various embodiments discussed herein.

FIG. 8 shows an example of the RRC procedure processing delay in general. The UE performance requirements for RRC procedures are specified in the following table(s). The performance requirement is expressed as the time (in ms) from the end of reception of the network→UE message on the UE physical layer up to when the UE shall be ready for the reception of uplink grant for the UE→network response message with no access delay other than the TTI-alignment (e.g., excluding delays caused by scheduling, the random access procedure or physical layer synchronisation). In case the RRC procedure triggers BWP switching, the RRC procedure delay is the value defined in the following table plus the BWP switching delay defined in 3GPP TS 38.133, clause 8.6.3, and discussed herein.

TABLE 1

UE performance requirements for RRC procedures for UEs

| Procedure title: | Network -> UE | UE -> Network | Value [ms] | Notes |
|---|---|---|---|---|
| RRC Connection Control Procedures | | | | |
| RRC reconfiguration | RRCReconfiguration | RRCReconfigurationComplete | 10 | |
| RRC reconfiguration (scell addition/release) | RRCReconfiguration | RRCReconfigurationComplete | 16 | |
| RRC reconfiguration (SCG establishment/ modification/release) | RRCReconfiguration | RRCReconfigurationComplete | 16 | |
| RRC setup | RRCSetup | RRCSetupComplete | 10 | |
| RRC Release | RRCRelease | | NA | |
| RRC re-establishment | RRCReestablishment | RRCReestablishmentComplete | 10 | |
| RRC resume | RRCResume | RRCResumeComplete | 6 or 10 | N = 6 applies for a UE supporting reduced CP latency for the case of RRCResume |

TABLE 1-continued

UE performance requirements for RRC procedures for UEs

| Procedure title: | Network -> UE | UE -> Network | Value [ms] | Notes |
|---|---|---|---|---|
| | | | | message only including MAC and PHY configuration, and no DRX, SPS, configured grant, CA or MIMO re-configuration will be triggered by this message. Further, the UL grant for transmission of RRCResumeComplete and the data is transmitted over common search space with DCI format 0_0. In this scenario, the RRC procedure delay can extend beyond the reception of the UL grant, up to 7 ms. For other cases N = 10 applies. |
| RRC resume (scell addition/release) | RRCResume | RRCResumeComplete | 16 | |
| Initial AS security activation | SecurityModeCommand | SecurityModeComplete/Security ModeFailure | 5 | |
| Other procedures | | | | |
| UE assistance information | | UEAssistanceInformation | NA | |
| UE capability transfer | UECapabilityEnquiry | UECapabilityInformation | FFS | |
| Counter check | CounterCheck | CounterCheckResponse | 5 | |

Figure 9:
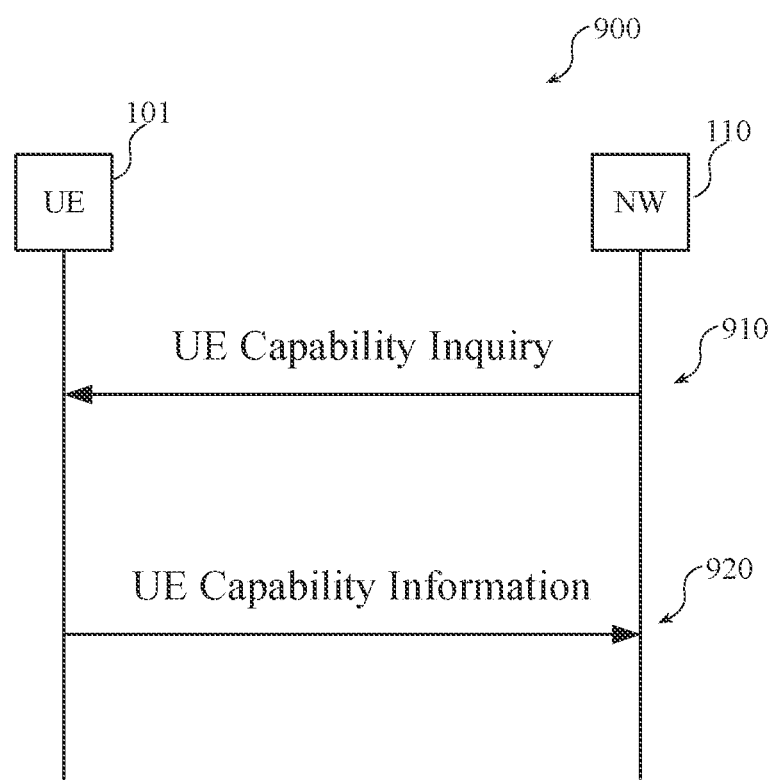
FIG. 9 is a diagram illustrating an example of messaging between a UE and a network node (NW) for facilitating an exchange of UE capability information with respect to BWP switching delay, according to various embodiments discussed herein.

The UE (e.g., UE 101 in FIG. 1) may compile and transfer its UE capability information upon receiving a UECapabilityEnquiry from the network as shown by FIG. 9 at 900. Alternatively, the UE may provide the network its UE capability information automatically in conjunction with a registration process with the network, in which case the network node already has such information. In the initial case where the UE provides capability information in response to a request, as shown by FIG. 9, the NW (e.g., RAN 110 in FIG. 1) initiates the procedure to the UE in RRC_CONNECTED when it needs (additional) UE radio access capability information. In one embodiment, upon reception of the UECapabilityEnquiry 910 by the UE, the UE sets the contents of UECapabilityInformation message as follows:

1> if the ue-CapabilityRAT-RequestList contains a UE-CapabilityRAT-Request with rat-Type set to nr.
  2> include in the ue-CapabilityRAT-ContainerList a UE-CapabilityRAT-Container of the type UE-NR-Capability and with the rat-Type set to nr;
    2> include the supportedBandCombinationList, featureSets and featureSetCombinations as specified in clause 5.6.1.4;

1> if the ue-CapabilityRAT-RequestList contains a UE-CapabilityRAT-Request with rat-Type set to eutra-nr:
  2> if the UE supports EN-DC:
    3> include in the ue-CapabilityRAT-ContainerList a UE-CapabilityRAT-Container of the type UE-MRDC-Capability and with the rat-Type set to eutra-nr;
    3> include the supportedBandCombinationList and featureSetCombinations as specified in clause 5.6.1.4;
1> if the ue-CapabilityRAT-RequestList contains a UE-CapabilityRAT-Request with rat-Type set to eutra:
  2> if the UE supports E-UTRA:
    3> include in the ue-CapabilityRAT-ContainerList a ue-CapabilityRAT-Container of the type UE-EU-TRA-Capability and with the rat-Type set to eutra as specified in TS 36.331 [10], clause 5.6.3.3, according to the capabilityRequestFilter, if received;
1> submit the UECapabilityInformation message to lower layers for transmission, upon which the procedure ends.

After setting the contents of the message, the UE 101 transmits such information to the network node 110 at 920 as shown.

Figure 10:
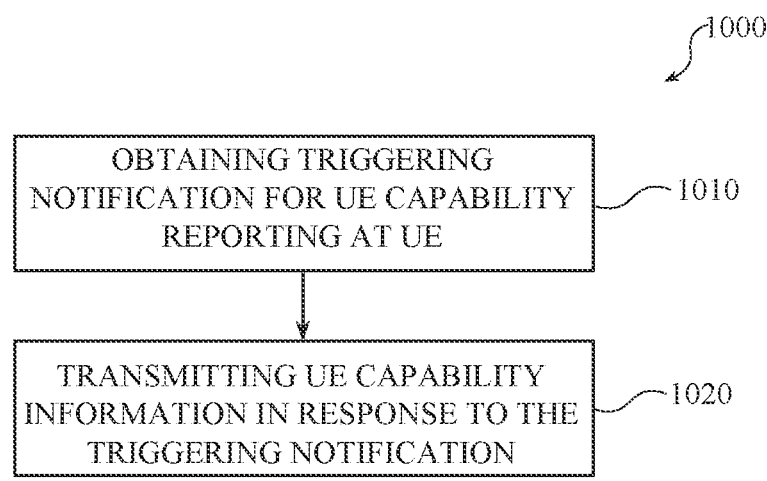
FIG. 10 is a flow chart diagram illustrating a method of employing UE capability information in accordance with RRC based BWP switching, according to various embodiments discussed herein.

Referring to FIG. 10, illustrated is a flow diagram of an example method 1000 employable at a UE that facilitates efficiency improvements by employing UE capability information for RRC based BWP switching, according to various embodiments discussed herein. In other aspects, a machine readable medium can store instructions associated with the method 1000 that, when executed, can cause a UE to perform the acts of method 1000.

At 1000 a method of performing bandwidth part (BWP) switching is disclosed. At 1010 the method comprises obtaining a triggering notification for user equipment (UE) capability reporting at the UE. In one embodiment, such a triggering comprises obtaining a triggering notification for user equipment (UE) capability reporting at the UE. In another embodiment such triggering notification occurs automatically in conjunction with a registration initialization procedure when the UE registers with a network node. In one embodiment the triggering comprises receipt at the UE of a UE capability inquiry message.

At act 1020 the method further comprises transmitting UE capability information from the UE to a network node in response to obtaining the triggering notification. In one embodiment the UE capability information is indicative of a time value reflecting a speed at which the UE can perform a BWP switching from a first BWP to a second, different BWP. In one particular embodiment, the UE capability information is one of a plurality of different types corresponding to one of a plurality of different BWP switching delay values. For example, a first type of UE capability information corresponds to a short delay time value, and a second type of UE capability information corresponds to a long delay time value that is greater than the short delay time value. In one embodiment the plurality of different types of UE capability information comprise predetermined, fixed time delay values. In one embodiment, at least one of the plurality of different types of UE capability information comprises a configured time delay value. The transmitting of UE capability information is performed in one embodiment using radio resource control, RRC, based messaging.

One such UE capability information has been transmitting, the UE may receive or transmit data, wherein data is received on a PDSCH from a network node or is transmitted on a PUSCH to the network node on a new BWP at a time period, t, dictated by the BWP switching delay of the transmitted UE capability information. In one embodiment the time period, t, corresponds to the BWP switching delay of indicated by the UE capability information and comprises: $t=(T_{RRCprocessingDelay}+T_{BWPswitchDelayRRC})/NR_{slot\ length}$, wherein $T_{BWPswitchDelayRRC}$ is a function of a capability of the UE. In one embodiment, $T_{BWPswitchDelayRRC}$ is 5 mS if the capability of the UE indicates a high capability, and $T_{BWPswitchDelayRRC}$ is 8 mS if the capability of the UE indicates a low capability that is less than the high capability.

Additionally or alternatively, method 1000 can include one or more other acts described herein.

Examples herein can include subject matter such as a method, means for performing acts or blocks of the method, at least one machine-readable medium including executable instructions that, when performed by a machine (e.g., a processor with memory (e.g., of device/apparatus 200, 300, 400, etc.), an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising one or more processors configured to transmit UE capability information indicative of a bandwidth part (BWP) switching delay supported by the UE to a network node.

Example 2 comprises the subject matter of any variation of any of example(s) 1, wherein the one or more processors are further configured to receive a UE capability inquiry message from the network node, and transmit the UE capability information in response to the received UE capability inquiry message.

Example 3 comprises the subject matter of any variation of any of example(s) 1-2, wherein the one or more processors are configured to transmit the UE capability information automatically in conjunction with a registration process with the network node.

Example 4 comprises the subject matter of any variation of any of example(s) 1-3, wherein the UE capability information is one of a plurality of different types corresponding to one of a plurality of different BWP switching delay values.

Example 5 comprises the subject matter of any variation of any of example(s) 1-4, wherein a first type of UE capability information corresponds to a short delay time value, and a second type of UE capability information corresponds to a long delay time value that is greater than the short delay time value.

Example 6 comprises the subject matter of any variation of any of example(s) 1-5, wherein the plurality of different types of UE capability information comprise predetermined, fixed time delay values.

Example 7 comprises the subject matter of any variation of any of example(s) 1-6, wherein at least one of the plurality of different types of UE capability information comprises a configured time delay value.

Example 8 comprises the subject matter of any variation of any of example(s) 1-7, wherein the one or more processors are configured to transmit the UE capability information using radio resource control, RRC, based messaging.

Example 9 comprises the subject matter of any variation of any of example(s) 1-8, wherein the one or more processors are further configured to receive PDSCH from the network node or transmit PUSCH to the network node on a new BWP at a time period, t, dictated by the BWP switching delay of the transmitted UE capability information.

Example 10 comprises the subject matter of any variation of any of example(s) 1-9, wherein the time period, t, corresponds to the BWP switching delay of indicated by the UE capability information and comprises: $t=(T_{RRCprocessing\ Delay}+T_{BWPswitchDelayRRC})/NR_{slot\ length}$, wherein $T_{BWPswitchDelayRRC}$ is a function of a capability of the UE.

Example 11 comprises the subject matter of any variation of any of example(s) 1-10, wherein $T_{BWPswitchDelayRRC}$ is 5 mS if the capability of the UE indicates a high capability, and $T_{BWPswitchDelayRRC}$ is 8 mS if the capability of the UE indicates a low capability that is less than the high capability, or wherein $T_{BWPswitchDelayRRC}$ is in the range from 5 ms to 8 ms if the capability of the UE indicates a high capability, $T_{BWPswitchDelayRRC}$ is Xms. if the capability of the UE indicates a low capability that is less than the high capability, $T_{BWPswitchDelayRRC}$ is Yms, where 5 ms≤X<Y≤8 ms.

Example 12 comprises a UE comprising the apparatus of any of claims 1-11.

Example 13 comprises a non-transitory machine-readable medium comprising instructions that, when executed, cause a User Equipment (UE) to transmit UE capability information indicative of a bandwidth part (BWP) switching delay supported by the UE to a network node.

Example 14 comprises the subject matter of any variation of any of example(s) 13, wherein the instructions, when executed, further cause the UE to receive a UE capability inquiry message from the network node, and transmit the UE capability information in response to the received UE capability inquiry message.

Example 15 comprises the subject matter of any variation of any of example(s) 13-14, wherein the instructions, when executed, further cause the UE to transmit the UE capability information automatically in conjunction with a registration process with the network node.

Example 16 comprises the subject matter of any variation of any of example(s) 13-15, wherein the UE capability information is one of a plurality of different types corresponding to one of a plurality of different BWP switching delay values.

Example 17 comprises the subject matter of any variation of any of example(s) 13-16, wherein a first type of UE capability information corresponds to a short delay time value, and a second type of UE capability information corresponds to a long delay time value that is greater than the short delay time value.

Example 18 comprises the subject matter of any variation of any of example(s) 13-17, wherein the plurality of different types of UE capability information comprise predetermined, fixed time delay values.

Example 19 comprises the subject matter of any variation of any of example(s) 13-18, wherein at least one of the plurality of different types of UE capability information comprises a configured time delay value.

Example 20 comprises the subject matter of any variation of any of example(s) 13-19, wherein the instructions, when executed, further cause the UE to transmit the UE capability information using radio resource control, RRC, based messaging.

Example 21 comprises the subject matter of any variation of any of example(s) 13-20, wherein the instructions, when executed, further cause the UE to receive PDSCH from the network node or transmit PUSCH to the network node on a new BWP at a time period, t, dictated by the BWP switching delay of the transmitted UE capability information.

Example 22 comprises the subject matter of any variation of any of example(s) 13-21, wherein the time period, t, corresponds to the BWP switching delay of indicated by the UE capability information and comprises t= $(T_{RRCprocessing\ Delay}+T_{BWPswitchDelayRRC})/NR_{slot\ length}$, wherein $T_{BWPswitchDelayRRC}$ is a function of a capability of the UE.

Example 23 comprises the subject matter of any variation of any of example(s) 13-22, wherein $T_{BWPswitchDelayRRC}$ is 5 mS if the capability of the UE indicates a high capability, and $T_{BWPswitchDelayRRC}$ is 8 mS if the capability of the UE indicates a low capability that is less than the high capability, or wherein $T_{BWPswitchDelayRRC}$ is in the range from 5 ms to 8 ms if the capability of the UE indicates a high capability, $T_{BWPswitchDelayRRC}$ is Xms. if the capability of the UE indicates a low capability that is less than the high capability, $T_{BWPswitchDelayRRC}$ is Yms, where 5 ms≤X<Y≤8 ms.

Example 24 comprises a method of performing bandwidth part (BWP) switching, comprising obtaining a triggering notification for user equipment (UE) capability reporting at the UE, and transmitting UE capability information in response to obtaining the triggering notification.

Example 25 comprises the subject matter of any variation of any of example(s) 24, wherein the triggering notification comprises a UE capability inquiry message.

Example 26 comprises the subject matter of any variation of any of example(s) 24-25, wherein the triggering notification comprises a registration initialization procedure by which the UE registers with a network node.

Example 27 comprises the subject matter of any variation of any of example(s) 24-26, wherein the UE capability information is indicative of a time value reflecting a speed at which the UE can perform a BWP switching from a first BWP to a second, different BWP.

Example 28 comprises the subject matter of any variation of any of example(s) 24-27, wherein the UE capability information is one of a plurality of different types corresponding to one of a plurality of different BWP switching delay values.

Example 29 comprises the subject matter of any variation of any of example(s) 24-28, wherein a first type of UE capability information corresponds to a short delay time value, and a second type of UE capability information corresponds to a long delay time value that is greater than the short delay time value.

Example 30 comprises the subject matter of any variation of any of example(s) 24-29, wherein the plurality of different types of UE capability information comprise predetermined, fixed time delay values.

Example 31 comprises the subject matter of any variation of any of example(s) 24-30, wherein at least one of the plurality of different types of UE capability information comprises a configured time delay value.

Example 32 comprises the subject matter of any variation of any of example(s) 24-31, wherein transmitting the UE capability information comprising transmitting using radio resource control, RRC, based messaging.

Example 33 comprises the subject matter of any variation of any of example(s) 24-32, further comprising receiving data on a PDSCH from a network node or transmitting data on a PUSCH to the network node on a new BWP at a time period, t, dictated by the BWP switching delay of the transmitted UE capability information.

Example 34 comprises the subject matter of any variation of any of example(s) 24-33, wherein the time period, t, corresponds to the BWP switching delay of indicated by the UE capability information and comprises:

$$t=(T_{RRCprocessing\ Delay}+T_{BWPswitchDelayRRC})/NR_{slot\ length},$$

wherein $T_{BWPswitchDelayRRC}$ is a function of a capability of the UE.

Example 35 comprises the subject matter of any variation of any of example(s) 24-34, wherein $T_{BWPswitchDelayRRC}$ is 5 mS if the capability of the UE indicates a high capability, and $T_{BWPswitchDelayRRC}$ is 8 mS if the capability of the UE indicates a low capability that is less than the high capability, or wherein $T_{BWPswitchDelayRRC}$ is in the range from 5 ms to 8 ms if the capability of the UE indicates a high capability, $T_{BWPswitchDelayRRC}$ is Xms. if the capability of the UE indicates a low capability that is less than the high capability, $T_{BWPswitchDelayRRC}$ is Yms, where 5 ms≤X<Y≤8 ms.

The following are additional example embodiments.

Example A01 includes a UE to indicate network which type of RRC based BWP switching delay is supported through UE capability signaling bwp-SwitchingDelay or other defined UE capability signaling.

Example A02 includes the UE of example A01 and/or some other example(s) herein, wherein, depending on UE capability bwp-SwitchingDelay (or other signaling for UE capability), the RRC based BWP switching delay $T_{BWPswitchDelayRRC}$ is given in the following table where $5 \leq X < Y \leq 10$, and X, Y are integers:

TABLE 1

| RRC based BWP switching delay BWP switch delay $T_{BWPswitchDelayRRC}$ (ms) | |
|---|---|
| Type 1 | Type 2 |
| X | Y |

Example A03 includes the UE of example A01 and/or some other example(s) herein, wherein, depending on UE capability bwp-SwitchingDelay, the RRC based BWP switching delay $T_{BwpswitchDelayRRC}$ is given in the following table:

TABLE 2

| RRC based BWP switching delay BWP switch delay $T_{BWPswitchDelayRRC}$ (ms) | |
|---|---|
| Type 1 | Type 2 |
| 5 | 8 |

Example B01 includes a method comprising: transmitting or causing to transmit a UE capability indicating a supported type of radio resource control (RRC) based bandwidth part (BWP) switching delay; and receiving a BWP switching request indicating a a downlink (DL) active BWP switch or an uplink (UL) active BWP switch based on the supported type of RRC based BWP switching delay.

Example B02 includes the method of example B01 and/or some other example(s) herein, further comprising: receiving a PDSCH for the DL active BWP switch on a new BWP on a serving cell on which the BWP switch occurs on the first DL slot right after the beginning of $$DL \text{ slot } n + \frac{T_{RRCprocessingDelay} + T_{BWPswitchDelayRRC}}{NR \text{ Slot length}},$$

where DL slot n is a last slot containing an RRC command, $T_{RRCprocessingDelay}$ is a length of an RRC procedure delay, and $T_{BWPswitchDelayRRC}$ is a time used to perform BWP switch.

Example B03 includes the method of example B01 and/or some other example(s) herein, further comprising: transmitting or causing to transmit a PUSCH for the UL active BWP switch on a new BWP on a serving cell on which the BWP switch occurs on the first DL slot right after the beginning of $$DL \text{ slot } n + \frac{T_{RRCprocessingDelay} + T_{BWPswitchDelayRRC}}{NR \text{ Slot length}},$$

where DL slot n is a last slot containing an RRC command, $T_{RRCprocessingDelay}$ is a length of an RRC procedure delay, and $T_{BWPswitchDelayRRC}$ is a time used to perform BWP switch.

Example B04 includes the method of examples B02-B03 and/or some other example(s) herein, wherein the UE capability is a bwp-SwitchingDelay parameter.

Example B05 includes the method of examples B02-B04 and/or some other example(s) herein, wherein the RRC based BWP switching delay is a type 1 BWP switching delay or type 2 BWP switching delay.

Example B06 includes the method of example B05 and/or some other example(s) herein, wherein $T_{BWPswitchDelayRRC}$=5 ms for the type 1 BWP switching delay, and $T_{SWPswitchDelayRRC}$=8 ms for the type 2 BWP switching delay.

Example B07 includes the method of example B05 and/or some other example(s) herein, wherein $T_{BWPswitchDelayRRC}$=X ms for the type 1 BWP switching delay, and $T_{SWPswitchDelayRRC}$=Y ms for the type 2 BWP switching delay, wherein $5 \leq X < Y \leq 10$, and X and Y are integers.

Example B08 includes the method of examples B01-B07 and/or some other example(s) herein, wherein the method is to be performed by a user equipment (UE) or a portion thereof.

Example Z01 may include an apparatus comprising means to perform one or more elements of a method described in or related to any of examples A01-A03, B01-B08, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A03, B01-B08, or any other method or process described herein.

Example Z03 may include an apparatus comprising logic, modules, or circuitry to perform one or more elements of a method described in or related to any of examples A01-A03, B01-B08, or any other method or process described herein.

Example Z04 may include a method, technique, or process as described in or related to any of examples A01-A03, B01-B08, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A03, B01-B08, or portions thereof.

Example Z06 may include a signal as described in or related to any of examples A01-A03, B01-B08, or portions or parts thereof.

Example Z07 may include a datagram, packet, frame, segment, protocol data unit (PDU), or message as described in or related to any of examples A01-A03, B01-B08, or portions or parts thereof, or otherwise described in the present disclosure.

Example Z08 may include a signal encoded with data as described in or related to any of examples A01-A03, B01-B08, or portions or parts thereof, or otherwise described in the present disclosure.

Example Z09 may include a signal encoded with a datagram, packet, frame, segment, protocol data unit (PDU), or message as described in or related to any of examples A01-A03, B01-B08, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A03, B01-B08, or portions thereof.

Example Z11 may include a computer program comprising instructions, wherein execution of the program by a processing element is to cause the processing element to carry out the method, techniques, or process as described in or related to any of examples A01-A03, B01-B08, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus for wireless communication, comprising:
one or more memories configured to store instructions;
one or more processors coupled to the one or more memories, and when executing the instructions, configured to:
cause to transmit, to a network node, UE capability information indicative of a bandwidth part (BWP) switching delay of a BWP switching triggered by a radio resource control (RRC) message; and
cause to communicate data with the network node according to the BWP switching delay,
wherein the UE capability information includes a selection from at least a first UE capability type and a second UE capability type, wherein the first UE capability type determines a first BWP switching delay; and the second UE capability type determines a second BWP switching delay greater than the first BWP switching delay.

2. The apparatus of claim 1, wherein the one or more processors are further configured to:
cause to receive a UE capability inquiry message from the network node; and
cause to transmit the UE capability information in response to the UE capability inquiry message, or
cause to transmit the UE capability information in conjunction with a registration process with the network node.

3. The apparatus of claim 1, wherein the first BWP switching delay and the second BWP switching delay are independent of a slot length.

4. The apparatus of claim 1, wherein the first BWP switching delay and the second BWP switching delay are predetermined, fixed time delay values.

5. The apparatus of claim 1, wherein the first BWP switching delay and the second BWP switching delay are configured rather than fixed values.

6. The apparatus of claim 1, wherein the UE capability information is communicated using radio resource control (RRC) based messaging.

7. The apparatus of claim 1, wherein the one or more processors are further configured to receive on Physical Downlink Shared Channel (PDSCH) from the network node or transmit on Physical Uplink Shared Channel (PUSCH) to the network node on a new BWP at a time period, t, dictated by the BWP switching delay.

8. The apparatus of claim 7, wherein the time period, $$t = (TRRCprocessingDelay + TBWPswitchDelayRRC) / NRslot\ length,$$

wherein TBWPswitchDelayRRC is a function of the BWP switching delay.

9. The apparatus of claim 1, wherein the first BWP switching delay is equal to or smaller than 5 milliseconds, and wherein the second BWP switching delay is equal to or smaller than 10 milliseconds.

10. A method of performing bandwidth part (BWP) switching, comprising:
obtaining, from a network node, a triggering notification for user equipment (UE) capability reporting, the triggering notification comprising a UE capability inquiry message; and
transmitting, to the network node, UE capability information of a UE in response to the triggering notification,
wherein the UE capability information indicates a BWP switching delay of a BWP switching triggered by a radio resource control (RRC) message, wherein the UE capability information includes a selection from at least a first UE capability type and a second UE capability type, wherein the first UE capability type determines a first BWP switching delay value, and the second UE capability type determines a second BWP switching delay value greater than the first BWP switching delay value.

11. The method of claim 10, wherein the triggering notification comprises a registration initialization procedure by which the UE registers with the network node.

12. The method of claim 10, wherein the UE capability information is indicative of a time value reflecting a speed at which the UE can perform a BWP switching from a first BWP to a second, different BWP.

13. The method of claim 10, wherein the first and second BWP switching delay values are independent of a slot length.

14. The method of claim 10, wherein the first BWP switching delay value and the second BWP switching delay value are configured rather than fixed values.

15. The method of claim 10, wherein transmitting the UE capability information comprising transmitting using radio resource control (RRC) based messaging.

16. The method of claim 10, further comprising receiving data on a Physical Downlink Shared Channel (PDSCH) from the network node or transmit on Physical Uplink Shared Channel (PUSCH) to the network node on a new BWP at a time period, t, dictated by the BWP switching delay.

17. The method of claim 16, wherein the time period, $$t=(TRRCprocessingDelay+TBWPswitchDelayRRC)/NRslot\ length,$$

wherein TBWPswitchDelayRRC is a function of the BWP switching delay.

18. The method of claim 17, wherein if the BWP switching delay indicates a high capability, TBWPswitchDelayRRC is Xms; and if the BWP switching delay indicates a low capability that is less than the high capability, TBWPswitchDelayRRC is Yms, where 5 ms≤X<Y≤8 ms.

* * * * *